United States Patent [19]
Gronbach et al.

[11] Patent Number: 5,878,905
[45] Date of Patent: Mar. 9, 1999

[54] CONTAINER-TYPE SWITCHGEAR

[75] Inventors: Peter Gronbach, Seligenstadt; Friedrich Kraus, Bensheim, both of Germany; Thomas Gföllner, Grieskirchen, Austria; Helmut Loisel, Schärding, Australia; Karl Pürethmair, Michaellnbach, Austria

[73] Assignee: ABB Patent GmbH, Mannheim, Germany

[21] Appl. No.: 920,474

[22] Filed: Aug. 29, 1997

[30]     Foreign Application Priority Data

Aug. 29, 1996 [DE] Germany .................. 296 15 011 U

[51] Int. Cl.⁶ ................................................ B65D 51/16
[52] U.S. Cl. ................................. 220/203.01; 220/89.1; 220/DIG. 27; 200/306; 218/157; 174/17 VA
[58] Field of Search ................ 220/203.01, 203.09, 220/203.1, 203.27, 203.29, 745, 89.1, 913, DIG. 27, 369, 367.1, 373, 361, 363, 202, 335; 200/306; 218/157; 174/17 VA

[56]             References Cited

U.S. PATENT DOCUMENTS

| 4,769,739 | 9/1988 | De Bruin | 218/157 X |
| 5,004,129 | 4/1991 | Loch et al. | 220/89.1 X |
| 5,461,831 | 10/1995 | Michal | 220/89.1 X |
| 5,689,097 | 11/1997 | Aufermann et al. | 218/157 |
| 5,710,402 | 1/1998 | Karnbach et al. | 218/157 |
| 5,753,878 | 5/1998 | Doughty et al. | 218/157 |

*Primary Examiner*—Stephen K. Cronin
*Assistant Examiner*—Nathan Newhouse
*Attorney, Agent, or Firm*—Herbert L. Lerner; Laurence A. Greenberg

[57]             ABSTRACT

Switchgear, such as gas-insulated, metal-encapsulated high-voltage switchgear, is accommodated in a container. The container has a side wall formed with an opening. An outwardly opening flap closes the opening in the normal situation. Upon a sudden pressure increase in the container, caused for instance by arcing, the flap is automatically opened and the container is vented. A linkage with a damper is connected to the flap for damping a motion of the flap into the open position.

15 Claims, 1 Drawing Sheet

CONTAINER-TYPE SWITCHGEAR

BACKGROUND OF THE INVENTION

1. Field of the Invention

The invention relates to container-type switchgear which is housed in a container; the switchgear is, in particular, a gas-insulated, metal-encased high-voltage switchgear.

For practical reasons, the installation of switchgear in a container provides for a great number of advantages. On the one hand, the container is a commercially available housing and, on the other hand, a container and its contents can be easily transported. For these reasons, container-type switchgear is becoming increasingly popular.

If an electric arc occurs within the switchgear of the container-type switchgear, or within the container in general, the electric arc results in a pronounced increase in the pressure and the temperature within the container. This sudden increase in the pressure and the temperature poses a risk of damage to the container which, in turn, could result in the uncontrolled escape of hot gases from the container. This poses a severe risk to persons in the vicinity.

SUMMARY OF THE INVENTION

It is accordingly an object of the invention to provide a container for container-type switchgear, which overcomes the above-mentioned disadvantages of the heretofore-known devices of this general type and which helps prevent any uncontrolled outflow of hot gases is prevented.

With the foregoing and other objects in view there is provided, in accordance with the invention, a container for housing container-type switchgear, comprising:

a container side wall and a container roof abutting the side wall, the side wall having an opening formed therein, and an outwardly opening flap closing the opening in a closed position thereof and allowing venting of the container in an open position thereof;

a linkage with a damper connected to the flap for damping a motion of the flap into the open position upon a sudden increase of force inside the container.

In accordance with an added feature of the invention, there is provided a stationary brace disposed at the container roof, and the linkage extends between the brace and the flap. The damper may be a shock absorber or an oil brake. The container-type switch gear is, in particular, gas-insulated, metal-encapsulated high-voltage switchgear accommodated in the container.

The objects of the invention are thus satisfied with the novel container which is provided with the opening on at least one container side wall and the opening is closed by the outwardly opening flap. A damped hinge linkage is provided between the roof and the flap. Accordingly, when a suddenly increasing pressure causes the flap to open, the flap moves in a damped manner into the open position.

The flap, in effect, is a pressure-relief flap, similarly to a rupture disc, which, upon an increase in pressure, opens outwardly due to the fact that the flap is articulated on the outside of the opening. Due to the fact that the flap is articulated about its bottom edge, hot gases can flow out upwards.

This is preferably improved in that the linkage is connected to the top edge of the flap.

In accordance with an additional feature of the invention, the linkage has a toggle-lever arrangement. The opening movement of the flap is thus divided into two portions. After an optional attachment and sealing provision has been ruptured and the flap has been released, it first opens in an undamped manner during a first part of the opening movement. During the second part, after the toggle lever has been extended, the opening movement is damped as the piston rod is being drawn out of the damper.

In this case, the toggle-lever arrangement may be arranged between the damper and the flap.

For the purpose of fixing the stationary end of the linkage, the L-shaped brace may be fitted on the underside of the roof, whereby its shorter leg runs perpendicularly with respect to the roof and whereby the linkage is articulated at the free end of the shorter leg.

Instead of the carrier being fastened on the roof, it is possible for the carrier to be fastened, by way of the end side of its longer leg, on the side wall, above the opening. The shorter leg likewise running perpendicularly with respect to the roof and being connected to the linkage in an articulated manner.

In both cases, the length of the shorter leg is dimensioned such that, in the closed state, the damper is positioned approximately parallel to the roof.

Instead of one linkage, it is also possible for two linkages to be provided one beside the other, each with their corresponding braces, by means of which the flap is secured in its open position.

For the purpose of ensuring that the flap does not accidentally open, it is attached, in the closed position, to the side wall by means of break-off screws or the like. An angle piece, of which one leg is approximately aligned with the inner surface of the side wall, can be fastened on at least those edges of the opening on which the flap is not articulated. The flap strikes against the leg in the closed state and is fastened thereon by means of break-off screws.

The articulation on the bottom flap edge may advantageously be designed as a hinge joint.

If an accidental arc occurs in the switchgear within the container, or within the container in general, then the pressure increases such that it is no longer possible for the flap to be secured by the screws; the screws break off and the toggle-lever arrangement with the two toggle levers then extends. The first opening movement of the flap is undamped. Thereafter, the toggle levers draw the stop rod out of the damper and thus brake and damp the final movement of the flap into its terminal open position.

This prevents the flap from possibly being wrenched open completely and flung away, which would endanger those in the vicinity of the container.

Other features which are considered as characteristic for the invention are set forth in the appended claims.

Although the invention is illustrated and described herein as embodied in a container for container-type switchgear, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
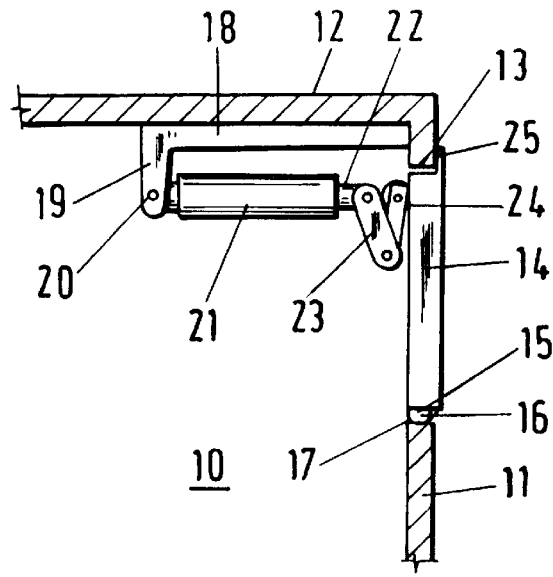
FIG. 1 is a schematic, partly sectional view of a container with a flap in the closed state, in accordance with a first embodiment of the invention.
Figure 3:
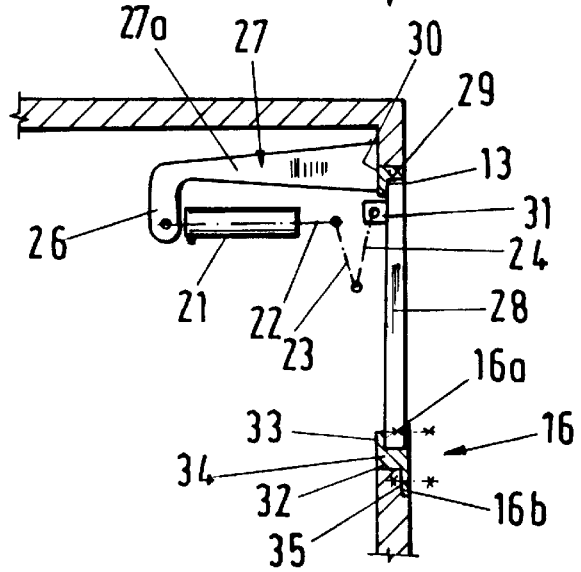
FIG. 3 is a view similar to that of FIG. 1, of a second embodiment of the invention.

Referring now to the figures of the drawing in detail and first, particularly, to FIG. 1 thereof, there is seen a container 10 which houses non-illustrated switchgear. The switchgear may be $SF_6$-insulated, metal-encased high-voltage switchgear. A side wall 11 of the container 10 is formed with an opening 13 in the vicinity of a roof 12 of the container 10. The opening 13 is closed by a flap 14, the bottom edge 15 of which is articulated at a lower edge 17 of the opening 13 by means of one or more hinges 16. As indicated in FIG. 3, the articulation 16 may also be effected by a hinge joint with bands 16a, 16b fastened on the flap 14 and on the lower edge of the opening 13, respectively. A brace 18 is disposed on the underside of the roof 12. The brace 18 is L-shaped, with the longer leg attached to the roof 12 and a shorter leg 19 carrying an articulation joint 20 for a damper 21 at its free end. A piston rod 22 projects out of the damper 21. A toggle-lever joint with a first lever 23 and a second lever 24 is articulated at the free end of the piston rod 22. The free end of the second lever 24 is connected at the upper end on the inside of the flap 14 in an articulated manner.

Figure 2:
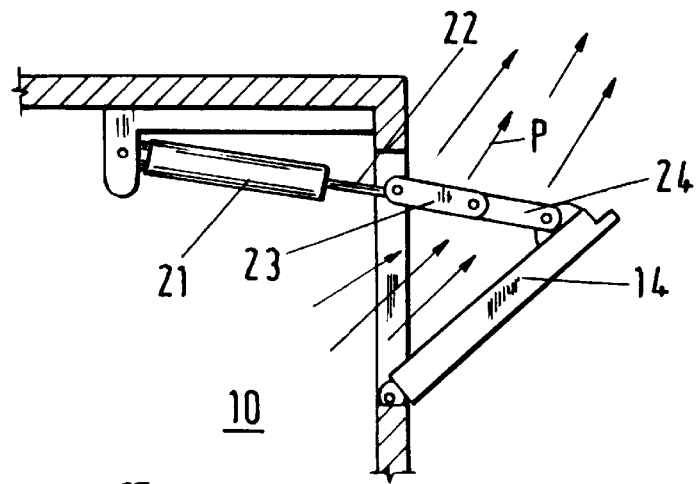
FIG. 2 is a similar view of the embodiment of FIG. 1 in the open position.

If an electric arc occurs in the interior of the switchgear or of the container 10—the electric arc causing a sudden increase in pressure—then the increased pressure (the pressure differential ΔP between the pressures inside and outside of the container) forces the flap 14 open. The toggle levers 23, 24, which are in the bent-down position when they are at rest, i.e., in the closed position of the flap 14, are thereby extended and, as the flap 14 opens, draw the piston rod 22 out of the damper 21. As a result, the initial portion of the opening motion, during which the toggle levers 23, 24 are extended, is undamped. The following partial motion, in which the piston rod 22 is drawn out of the damper 21, is damped until the fully open position of the flap 14 (see FIG. 2) has been reached. The hot gases escaping from the container 10 now flow out upwardly in the direction of the arrows P. Any danger to persons in the vicinity of the container is thus reliably avoided, in that the hot gases do not escape in an uncontrolled manner and they are blown off into a direction generally away from such persons. The damper acts as a movement brake, in particular as an oil brake.

The length of the leg 19 is dimensioned such that the damper 21 is oriented horizontally, i.e., parallel to the roof 12.

In the closed position, the flap 14, which overlaps the opening 13 with a peripheral border 25, is fastened on the outer surface of the side wall 11 by means of metal or plastic break-off screws 36. Instead of a damper 21, use may also be made of an oil brake which only reacts to tension.

The preferred embodiment is formed with two linkages 23, 24. It is also possible, however, to provide three or more links.

Instead of a border 25, it is also possible for an angle piece 29 to be provided along the edges of the opening 13, except for the edge (bottom) at which the flap 28 is articulated. A leg 30 of the angle piece 29 is thereby aligned with the inner surface of the side wall 11. The flap 28 thereby strikes against the leg 30 in the closed position and it is fastened to the leg 30 with non-illustrated screws.

With reference to FIG. 3, a brace 27 at which the linkage or linkages are fastened may by attached, by way of an end surface of its long leg 27a, on the inner surface of the side wall 11, just above the opening 13. The short leg 26 of the brace 27 which projects perpendicularly with respect to the roof plane, is dimensioned such that the damper 21 is oriented horizontally in the closed position of the flap 28. The toggle levers 23, 24 are illustrated by dash-dotted lines in FIG. 3. A link plate 31 is fastened on an inside of the flap 28 for the purpose of articulating the toggle lever 24 on the flap 28. The latter, in the embodiment according to FIG. 3, does not have a border 25. A Z-shaped profile is provided on the bottom edge of the opening 13. An inner leg 33 of the Z-shaped profile 32 is located in the plane of the legs 30 of the angle pieces 29. The legs 30 and the leg 33 thus form a stop plane, against which the flap 28 strikes in the closed position. The crossbar 34 of the Z-profile 32 runs horizontally on the bottom edge of the opening 13, and the band 16b of the hinge joint 16 is fastened on the leg 35, which covers over the bottom edge on the outside and is directed away from the opening 13, of the Z-shaped profile 32. The other band 16a of the hinge joint is fastened on the outer surface of the flap 28. Of course, it is possible for any type of articulation to be provided on this bottom edge of the flap 28.

Non-illustrated seals may be provided along the angle pieces and the Z-shaped profile for sealing the interspaces between the flap and opening.

We claim:

1. A container for housing container-type switchgear, comprising:

a container side wall and a container roof abutting said side wall, said side wall having an opening formed therein, and an outwardly opening flap closing said opening in a closed position thereof and allowing venting of the container in an open position thereof; and a linkage with a damper connected to said flap for damping a motion of said flap into the open position upon a sudden increase of pressure inside the container.

2. The container according to claim 1, which further comprises a stationary brace disposed at said container roof, said linkage extending between said brace and said flap.

3. The container according to claim 1, wherein said damper is an oil brake.

4. The container according to claim 1, wherein said flap pivots between the open and closed positions about an axis extending along a bottom edge thereof.

5. The container according to claim 1, wherein said linkage is connected to said flap at an upper edge thereof.

6. The container according to claim 1, wherein said damper includes a piston rod and said linkage includes a toggle-lever arrangement, and wherein an opening motion of said flap from the closed position into the open position includes a first, undamped motion during which said toggle-lever arrangement is extended, and a second, damped motion during which said piston rod is being drawn out of said damper.

7. The container according to claim 6, wherein said toggle-lever arrangement is disposed between said damper and said flap.

8. The container according to claim 1, which further comprises an L-shaped brace fitted on an underside of said roof, said L-shaped brace having a shorter leg extending perpendicular to said roof, said linkage being articulated on a free end of said shorter leg.

9. The container according to claim 8, wherein said shorter leg is dimensioned such that said damper is oriented substantially parallel to said roof in the closed position of said flap.

10. The container according to claim 9, wherein said shorter leg is dimensioned such that said damper is oriented substantially parallel to said roof in the closed position of said flap.

11. The container according to claim 1, which further comprises an L-shaped brace having a relatively longer leg extending parallel to said roof and being fastened to said side wall above said opening, and a relatively shorter leg extending perpendicular to said roof, said linkage being articulated on a free end of said shorter leg.

12. The container according to claim 1, wherein said flap is attached, in the closed position thereof, to said side wall with break-off screws.

13. The container according to claim 1, which further comprises an angle piece disposed at an edge of said opening, said angle piece having a leg approximately aligned with an inner surface of said side wall, said flap striking against said leg in the closed position thereof and being fastened thereon with break-off screws.

14. The container according to claim 1, including a hinge joint about which said flap pivots between the open and closed positions.

15. A switchgear and container for housing the switchgear comprising:

a container side wall and a container roof abutting said side wall, said side wall having an opening formed therein, and an outwardly opening flap closing said opening in a closed position thereof and allowing venting of the container in an open position thereof;

a linkage with a damper connected to said flap for damping a motion of said flap into the open position upon a sudden increase of pressure inside the container; and the switchgear is a gas-insulated, metal-encapsulated high-voltage switchgear accommodated in the container.

\* \* \* \* \*

UNITED STATES PATENT AND TRADEMARK OFFICE
CERTIFICATE OF CORRECTION

PATENT NO. : 5,878,905
DATED      : March 9, 1999
INVENTOR(S): Peter Gronbach et al.

It is certified that error appears in the above-indentified patent and that said Letters Patent is hereby corrected as shown below:

On the title page,
Item [75] should read as follows:

Peter Gronbach, Seligenstadt, Friedrich Kraus, Bensheim, both of Germany; Thomas Gföllner, Grieskirchen, Helmut Loisel, Schärding, Karl Purethmaier, Michealnbach, all of Austria.

Item [30] should read as follows:

Aug. 29, 1996   [DE]   Germany ....... 296 15 011.8

Signed and Sealed this

Twenty-sixth Day of October, 1999

*Attest:*

Q. TODD DICKINSON

*Attesting Officer*   *Acting Commissioner of Patents and Trademarks*